(12) United States Patent
Shiraki

(10) Patent No.: US 8,482,571 B2
(45) Date of Patent: Jul. 9, 2013

(54) INFORMATION PROCESSING PROCESSING APPARATUS, METHOD FOR CONTROLLING INFORMATION PROCESSING APPARATUS, AND PROGRAM

(75) Inventor: Hisakazu Shiraki, Kanagawa (JP)

(73) Assignee: Sony Corporation, Tokyo (JP)

( * ) Notice: Subject to any disclaimer, the term of this patent is extended or adjusted under 35 U.S.C. 154(b) by 111 days.

(21) Appl. No.: 13/157,934

(22) Filed: Jun. 10, 2011

(65) Prior Publication Data

US 2011/0310107 A1   Dec. 22, 2011

(30) Foreign Application Priority Data

Jun. 18, 2010   (JP) ................ P2010-139719

(51) Int. Cl.
  *G06F 15/80*   (2006.01)
  *G06F 15/16*   (2006.01)
  *G06F 9/46*    (2006.01)
  *G06T 1/00*    (2006.01)

(52) U.S. Cl.
  USPC ........... 345/505; 345/501; 345/502; 345/503; 345/504; 345/506; 718/105

(58) Field of Classification Search
  None
  See application file for complete search history.

(56) References Cited

U.S. PATENT DOCUMENTS

2006/0059494 A1    3/2006  Wexler et al.
2006/0221087 A1*  10/2006  Diard ........................... 345/505
2009/0109230 A1*   4/2009  Miller et al. ................. 345/506

* cited by examiner

*Primary Examiner* — Ke Xiao
*Assistant Examiner* — Donna Ricks
(74) *Attorney, Agent, or Firm* — Frommer Lawrence & Haug LLP; William S. Frommer

(57) ABSTRACT

There is provided an information processing apparatus, including a first processing unit capable of processing an image, a second processing unit capable of processing the image in parallel for each unit dividing the image, and a controller section configured to perform a control to select one of the first processing unit, the second processing unit, and both of them as a subject or subjects processing the image, to divide, in a case where both the first processing unit and the second processing unit are selected, the image into a first region and a second region, and to assign processing of an image of the first region and processing of an image of the second region, which are obtained by the division, to the first processing unit and the second processing unit, respectively, to cause the first processing unit and the second processing unit to perform the processing.

9 Claims, 10 Drawing Sheets

INFORMATION PROCESSING PROCESSING APPARATUS, METHOD FOR CONTROLLING INFORMATION PROCESSING APPARATUS, AND PROGRAM

BACKGROUND

The present disclosure relates to an information processing apparatus configured to process an image, a method for controlling the information processing apparatus, and a program.

In recent years, enhanced performance and high functionality of general-purpose computer hardware enable image processing by using general-purpose computer hardware, which only dedicated hardware was able to implement before. In the computer hardware, specifically, CPUs and memories used as main memories exhibit extremely high speed, and as a result, various complicated effect processing with respect to large-capacity image data may be performed in an economic and satisfying time period.

Image processing may be performed at a further higher speed by introducing GPU (Graphics Processing Unit) which is an arithmetic processing device designed so as to be specialized in parallel arithmetic processing. The parallel arithmetic processing by GPU may exhibit enhanced performance specifically in processing in which arithmetic results of part of processing do not affect the entire processing such as image processing. The parallel arithmetic processing by GPU is implemented by a mechanism including issuing the same instructions to a plurality of arithmetic units and executing the same instructions by the respective arithmetic units independently. To the contrary, in CPU, different instructions are issued to a plurality of arithmetic units and the arithmetic units execute different instructions, respectively. Therefore, CPU is suitable for sequential processing.

Further, recently, a technical field of GPGPU (General-Purpose computing on Graphics Processing Units) which enables GPU not only to perform image processing but also to be used for other numerical processing is known.

Japanese Patent Application Laid-open No. 2008-513890 (paragraph 0027) (hereinafter, referred to as Patent Document 1) describes load distribution in a case where a CPU and a GPU process a work unit. Specifically, the GPU calculates, in parallel, intersections of a plurality of rays and a set of surfaces bounding at least one graphic object, and the CPU calculates intersections of at least some of the plurality of rays and the graphical objects. However, Patent Document 1 fails to describe that image processing is distributed to a CPU and a GPU to be performed, that an optimum image processing subject is selected considering states of load of the CPU and the GPU, and the like.

As described above, in recent years, high speed of CPU enables practically enough response in image processing. That is, sharing and performing image processing, which was dependent on only GPU, by CPU and GPU increases the possibility of performing the image processing at a higher speed than performing only by GPU, as a result. Further, even if CPU and GPU share to perform image processing at the highest speed from the viewpoint of specs, according to load states of CPU and GPU or usage states of their memories, GPU may perform the image processing at a higher speed by itself than the case where CPU and GPU share the image processing. As described above, sharing and performing image processing by CPU and GPU is not always optimum from the viewpoint of speed.

SUMMARY

According to the above-mentioned circumstances, it is desirable to provide an information processing apparatus, a method for controlling an information processing apparatus, and a program, capable of using a CPU and a GPU flexibly and performing image processing efficiently.

According to an embodiment of the present disclosure, there is provided an information processing apparatus, including a first processing unit capable of processing an image, a second processing unit capable of processing the image in parallel for each unit dividing the image, and a controller section configured to perform a control to select one of the first processing unit, the second processing unit, and both of them as a subject or subjects processing the image, to divide, in a case where both the first processing unit and the second processing unit are selected, the image into a first region and a second region, and, to assign processing of an image of the first region and processing of an image of the second region, which are obtained by the division, to the first processing unit and the second processing unit, respectively, to cause the first processing unit and the second processing unit to perform the processing.

According to the embodiment of the present disclosure, one of the first processing unit, the second processing unit, and both of them is selected as a subject or subjects processing the image. So, according to the states of load of the respective processing units, image processing conditions, and the like, image processing may be performed efficiently.

The controller section is configured to select, in a case of processing the entire image, both the first processing unit and the second processing unit as the subjects processing the image. Load on image processing is proportional to the number of pixels to be processed, that is, the area of an image. Therefore, in a case of processing the entire image, by using both the first processing unit and the second processing unit, image processing may be performed at a higher speed.

The controller section is configured to determine the area of the first region and the area of the second region such that a first processing time that it takes for the first processing unit to process the first region is equal to or approximately equal to a second processing time that it takes for the second processing unit to process the second region. Therefore, processing of the respective regions is completed at the same or approximately the same timing. As a result, image processing may be completed at the highest speed.

Further, the information processing apparatus according to the embodiment of the present disclosure may further include a first memory used for processing of the image by the first processing unit, and a second memory used for processing of the image by the second processing unit, in which the controller section is configured to calculate predicted usage of the second memory assuming a case where processing of the image of the first region and processing of the image of the second region are assigned to the first processing unit and the second processing unit, respectively, to cause the first processing unit and the second processing unit to perform the processing, and to modify, in a case where the calculated predicted usage of the second memory reaches a threshold, the determined area of the first region and the determined area of the second region such that the predicted usage falls in a capacity of the second memory that the second processing unit is allowed to use. Therefore, while considering the use state of the second memory used for processing of the image by the second processing unit, processing of the image is assigned to the respective processing units to be performed preferably.

The controller section may be configured to obtain, in a case where the predicted usage of the second memory fails to exceed the capacity of the second memory, utilization rate of the first processing unit, and to assign, in a case where the utilization rate fails to reach a threshold, processing of the image of the first region and processing of the image of the second region to the first processing unit and the second processing unit selected as the subjects, respectively, to cause the first processing unit and the second processing unit to perform the processing. Therefore, while considering the utilization rate of the first processing unit, processing of the image is assigned to the respective processing units to be performed preferably.

The controller section may be configured to calculate, in a case of processing part of the image, a predicted processing time assuming a case where the first processing unit processes the part of the image and a predicted processing time assuming a case where the second processing unit processes the part of the image, and to select a processing unit whose predicted processing time is smaller as a subject processing the part of the image.

The controller section may be configured to calculate, in a case where the second processing unit is selected as the subject, predicted usage of the second memory assuming a case where the second processing unit processes the part of the image, and to cause, in a case where the calculated predicted usage of the second memory fails to reach the threshold, the second processing unit to process the part of the image. Therefore, while considering the use state of the second memory used for processing of the image by the second processing unit, the second processing unit may process the part of the image.

Further, the controller section may be configured to obtain, in a case where the first processing unit is selected as the subject, utilization rate of the first processing unit, and to cause, in a case where the utilization rate fails to reach a threshold, the first processing unit to process the part of the image. Therefore, while considering the utilization rate of the first processing unit, the first processing unit may process the part of the image.

According to another embodiment of the present disclosure, there is provided a method for controlling an information processing apparatus including a first processing unit capable of processing an image, and a second processing unit capable of processing the image in parallel for each unit dividing the image, including selecting, by a controller section, one of the first processing unit, the second processing unit, and both of them as a subject or subjects processing the image, dividing, in a case where both the first processing unit and the second processing unit are selected, the image into a first region and a second region, and assigning processing of an image of the first region and processing of an image of the second region, which are obtained by the division, to the first processing unit and the second processing unit, respectively, to cause the first processing unit and the second processing unit to perform the processing.

According to another embodiment of the present disclosure, there is provided a program causing a computer including a first processing unit capable of processing an image, and a second processing unit capable of processing the image in parallel for each unit dividing the image, to function as a controller section configured to perform a control to select one of the first processing unit, the second processing unit, and both of them as a subject or subjects processing the image, to divide, in a case where both the first processing unit and the second processing unit are selected, the image into a first region and a second region, and to assign processing of an image of the first region and processing of an image of the second region, which are obtained by the division, to the first processing unit and the second processing unit, respectively, to cause the first processing unit and the second processing unit to perform the processing.

As described above, according to the embodiments of the present disclosure, by using a CPU and a GPU flexibly, image processing is performed efficiently.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

First Embodiment

Information Processing Apparatus

This embodiment relates to an information processing apparatus executing an image processing program in a computer on which a CPU (Central Processing Unit) and a GPU (Graphics Processing Unit) are mounted, to thereby perform image processing such as effect processing, for example, with respect to image data.

Figure 1:
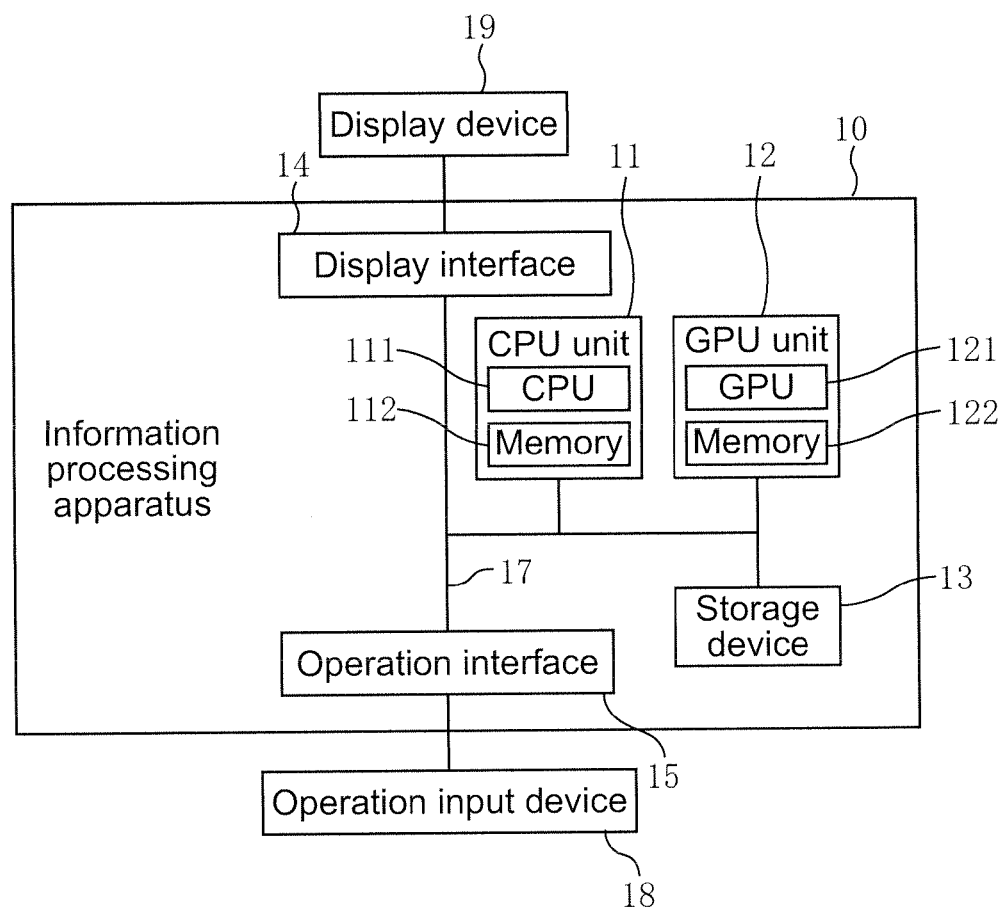
FIG. 1 is a diagram showing a structure of an information processing apparatus according to an embodiment of the present disclosure.

FIG. 1 is a diagram showing a structure of an information processing apparatus according to an embodiment of the present disclosure.

As shown in FIG. 1, an information processing apparatus 10 includes a CPU unit 11, a GPU unit 12, a storage device 13, a display interface unit 14, an operation interface unit 15, and a bus 17 connecting them each other.

The CPU unit 11 includes a CPU 111 (first processing unit) and a memory (hereinafter, referred to as "CPU memory 112") (first memory), and executes an image processing program for CPU stored in the CPU memory 112, to thereby perform instructions with regard to various kinds of arithmetic processing in the CPU memory 112. The CPU unit 11 interprets commands by a user input from an operation input device 18 connected to the operation interface unit 15, to thereby reflect them to the behavior of the image processing program. Further, the CPU unit 11 may read image data from the storage device 13 based on commands by a user and the like, store the image data in an image buffer provided in the CPU memory 112, and perform processing such as effects with respect to the image data. The image data in the image buffer is supplied to the display interface unit 14, is subjected to drawing processing to thereby be visible data in units of pixel, and is output to a display device 19. Further, the CPU unit 11 may write the edited image data in the image buffer in the storage device 13 based on a command by a user and the like.

The GPU unit 12 includes a GPU 121 (second processing unit) and a memory (hereinafter, referred to as "GPU memory 122") (second memory), and may execute an image processing program for GPU stored in the GPU memory 122, to thereby perform image processing in parallel in the GPU memory 122. Controlled by the CPU unit 11, the GPU unit 12 may store image data read out from the storage device 13 in an image buffer provided in the GPU memory 122, and to thereby perform processing such as effects with respect to the image data in parallel for each unit such as a thread dividing an image or the like. The image data in the image buffer is supplied to the display interface unit 14, is subjected to drawing processing to thereby be visible data in units of pixel, and is output to the display device 19. Further, the GPU unit 12 may write, for example, the edited image data in the image buffer in the storage device 13 based on a command by the CPU unit 11 and the like.

The display interface unit 14 is an interface to the display device 19, receives image data from the CPU unit 11 and/or the GPU unit 12 to perform drawing processing, and supplies drawing data to the display device 19. The processing by the display interface unit 14 may be performed by a dedicated GPU (not shown) provided in the display interface unit 14 or may be performed by, for example, the above-mentioned GPU 121.

The operation interface unit 15 is an interface to the operation input device 18, supplies data and commands by a user input from the operation input device 18 to the CPU 111, and the like.

The storage device 13 stores unedited and edited image data. Further, the storage device 13 also stores image processing programs. The image processing programs stored in the storage device 13 include programs for the CPU 111 and programs for the GPU 121. The programs for the CPU 111 are loaded from the storage device 13 into the CPU memory 112 of the CPU unit 11, and executed by the CPU 111. Further, the programs for the GPU 121 are loaded from the storage device 13 into the GPU memory 122 of the GPU unit 12, and executed by the GPU 121.

(Structure and Execution Mode of Image Processing Program)

Figure 2:
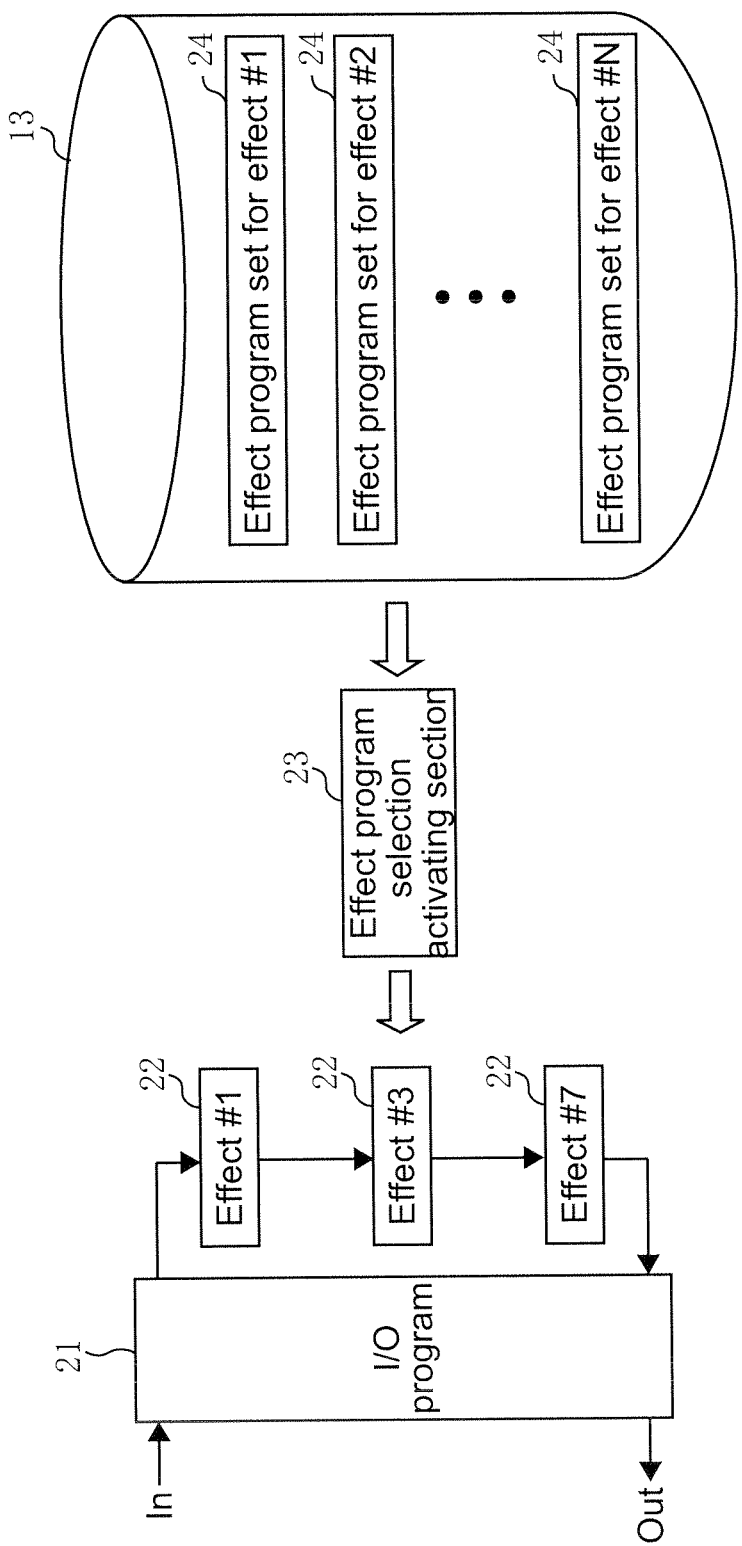
FIG. 2 is a diagram showing an execution mode of image processing programs in the information processing apparatus of FIG. 1.

FIG. 2 is a diagram showing an execution mode of image processing programs in the information processing apparatus 10 of this embodiment. As shown in FIG. 2, an execution mode of image processing programs includes an I/O program 21, and one or more effect plug-in programs 22 connected to the I/O program 21. Here, the one or more effect plug-in programs 22 correspond to effects of kinds arbitrarily selected by a user, respectively.

The I/O program 21 is a program controlling input/output of image data. More specifically, the I/O program 21 reads out image data from the storage device 13 of FIG. 1, and transfers it to the connected effect plug-in program 22. The I/O program 21 receives image data subjected to effect processing from the effect plug-in program 22, and writes it back to the storage device 13 or outputs it to the display device 19 through the display interface unit 14.

The one or more effect plug-in programs 22 corresponding to effects of kinds arbitrarily selected by a user, respectively, are connected to the I/O program 21 in serial. Specifically, the most upstream effect plug-in program 22 receives image data from the I/O program 21 to perform effect processing, and transfers the result to the effect plug-in program 22 lying one-stage downstream side thereof. The effect plug-in program 22 other than the most upstream one and the most downstream one receives image data from the effect plug-in program 22 lying one-stage upstream side thereof to perform effect processing, and transfers the result to the effect plug-in program 22 lying one-stage downstream side thereof. The most downstream effect plug-in program 22 receives image data from the effect plug-in program 22 lying one-stage upstream side thereof to perform effect processing, and transfers the result to the I/O program 21. As described above, according to this embodiment, image data is directly transferred between the effect plug-in programs 22. Alternatively, image data may be transferred between the adjoining effect plug-in programs 22 via the I/O program 21.

Figure 3:
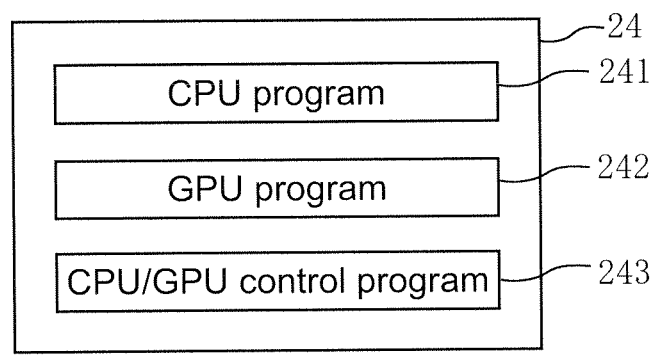
FIG. 3 is a diagram showing a structure of an effect program set.

Meanwhile, the storage device 13 stores effect program sets 24 for kinds of effect, respectively. Each of the effect program sets 24 includes, as shown in FIG. 3, a CPU program 241 causing the CPU 111 to perform effect processing with respect to image data, a GPU program 242 causing the GPU 121 to perform the effect processing, and a CPU/GPU control program 243 controlling to assign execution of the effect processing to the CPU 111 and the GPU 121 to perform the processing. Each of the CPU program 241, the GPU program 242, and the CPU/GPU control program 243 is referred to as "effect program" in a case where they are not distinguished from one another.

The CPU program 241 is a program causing the CPU 111 to perform effect processing with respect to image data. More specifically, the CPU program 241 includes procedure such as (1) receiving image buffer in the CPU memory 112 from the I/O program 21 or the effect plug-in program 22 connected one-stage upstream side, (2) causing the CPU 111 to perform effect processing, (3) writing the result of the effect processing in an image buffer, and (4) transferring the image buffer to the effect plug-in program 22 connected one-stage downstream side, or returning it to the I/O program 21.

The GPU program 242 is a program causing the GPU 121 to perform effect processing with respect to image data. More specifically, the GPU program 242 includes procedure such as (1) storing image data from the CPU memory 112 in the GPU memory 122, or receiving an image buffer in the GPU memory 122 from the effect plug-in program 22 connected one-stage upstream side, (2) causing the GPU 121 to perform effect processing, (3) writing the result of the effect processing in an image buffer, and (4) transferring the image buffer to the effect plug-in program 22 connected one-stage downstream side, or transferring image data in the GPU memory 122 to the CPU memory 112.

Figure 4:
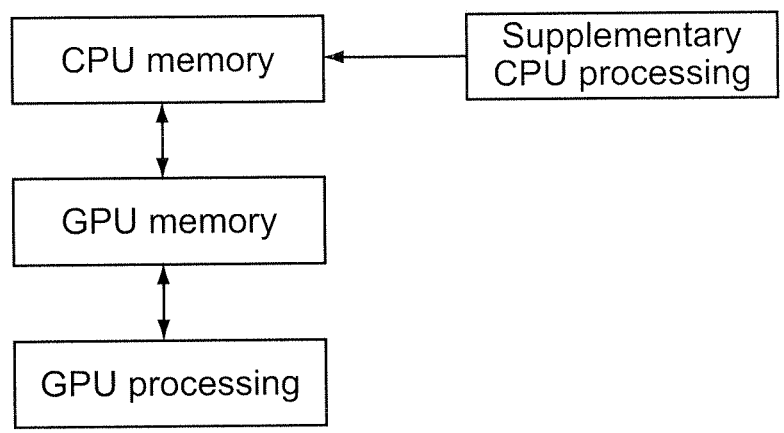
FIG. 4 is a diagram showing an example of a behavior of a GPU program.

Further, the GPU program 242 may not be designed to complete effect processing only by the GPU 121, but may be designed, as shown in FIG. 4, to supplementarily request the CPU 111 to perform part of calculation and to store the calculation result from the CPU memory 112 in the GPU memory 122. Specific examples thereof include filtering processing such as defocusing. The GPU 121 exercises high-speed performance in processing in which simple product-sum operations are performed in large numbers, and fails to exercise high-speed performance in sequential processing such as conditional branch. For example, defocusing processing includes two-stage processing of generating filters for defocusing and convoluting the filters on an image. Generating a filter for defocusing requires small number (at most about a few hundreds of taps) of product-sum operation, but requires many conditional branches depending on parameters such as shape of iris and angle. In such defocusing processing, in a case where the CPU 111 generates filters and the GPU 121 convolutes the filters on an image, the GPU 121 exercises the high-speed performance and processing efficiency may be improved. Meanwhile, for example, since filtering processing without a conditional branch such as moving-average filtering processing performing uniformly weighting pixels requires no filter generation, the GPU 121 completes processing by itself. As described above, the GPU program 242 may be designed such that the GPU 121 completes processing by itself, or that the GPU 121 is requested to perform part of sequential calculation processing.

Figure 5:
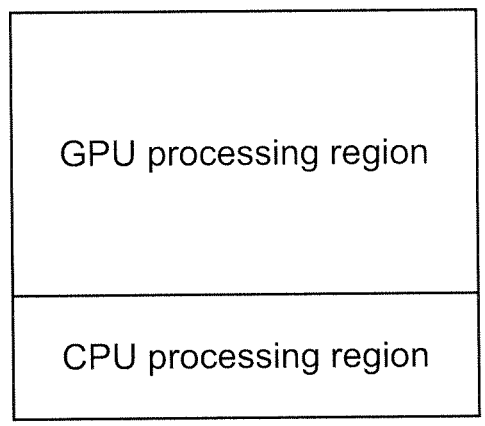
FIG. 5 is a diagram explaining division of regions of an image by a CPU/GPU control program.
Figure 6:
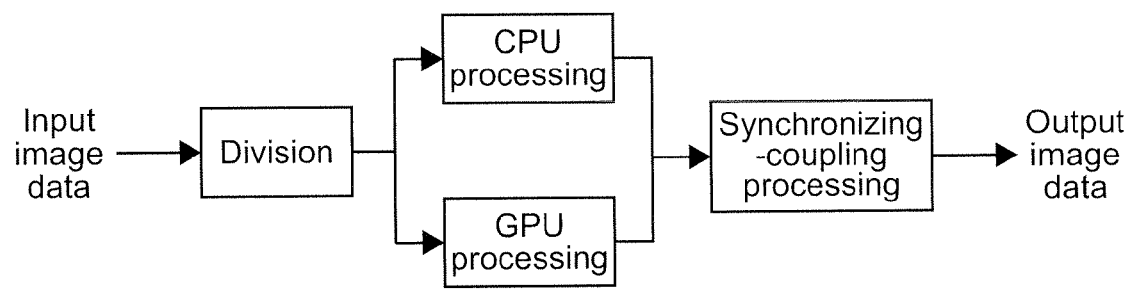
FIG. 6 is a diagram showing controls of the CPU/GPU control program.

The CPU/GPU control program 243 is an effect program assigning execution of the effect processing selected by a user to the CPU 111 and the GPU 121. For example, as shown in FIGS. 5 and 6, the CPU/GPU control program 243 divides an image into two regions, and supplies information on the regions to the CPU program 241 and the GPU program 242 respectively such that calculation for the divided regions are assigned to the CPU 111 and the GPU 121 respectively. Further, the CPU/GPU control program 243 synchronizes the respective processing results of the CPU 111 and the GPU 121 and couples them to thereby generate a processing result for full screen.

Referring back to FIG. 2, an effect program selection activating section 23 (controller section) is a program causing the CPU 111 to behave to call at least one effect programs from the effect program sets 24 corresponding to effects of kinds selected by a user according to a predetermined algorithm, and to connect them to the I/O program 21 as the above-mentioned effect plug-in programs 22.

That is, in the execution mode of the image processing program of FIG. 2, first, the I/O program 21 reads out image data selected by a user from the storage device 13. Next, the effect program selection activating section 23 calls at least one effect programs from the effect program sets 24 corresponding to effects selected by a user according to a predetermined algorithm, and connects them to the I/O program 21 as the effect plug-in programs 22. Therefore, the one or more effect plug-in programs 22 connected to the I/O program 21 perform effect processing with respect to image data. The image data subjected to the effect processing is output to the display interface unit 14 by the I/O program 21, and is displayed on the display device 19 as a visible image. Further, the I/O program 21 writes back image data subjected to effect processing in the storage device 13 according to commands by a user.

(Effect Program Selection Activating Section 23)

Next, the effect program selection activating section 23 will be described in detail.

Figure 7:
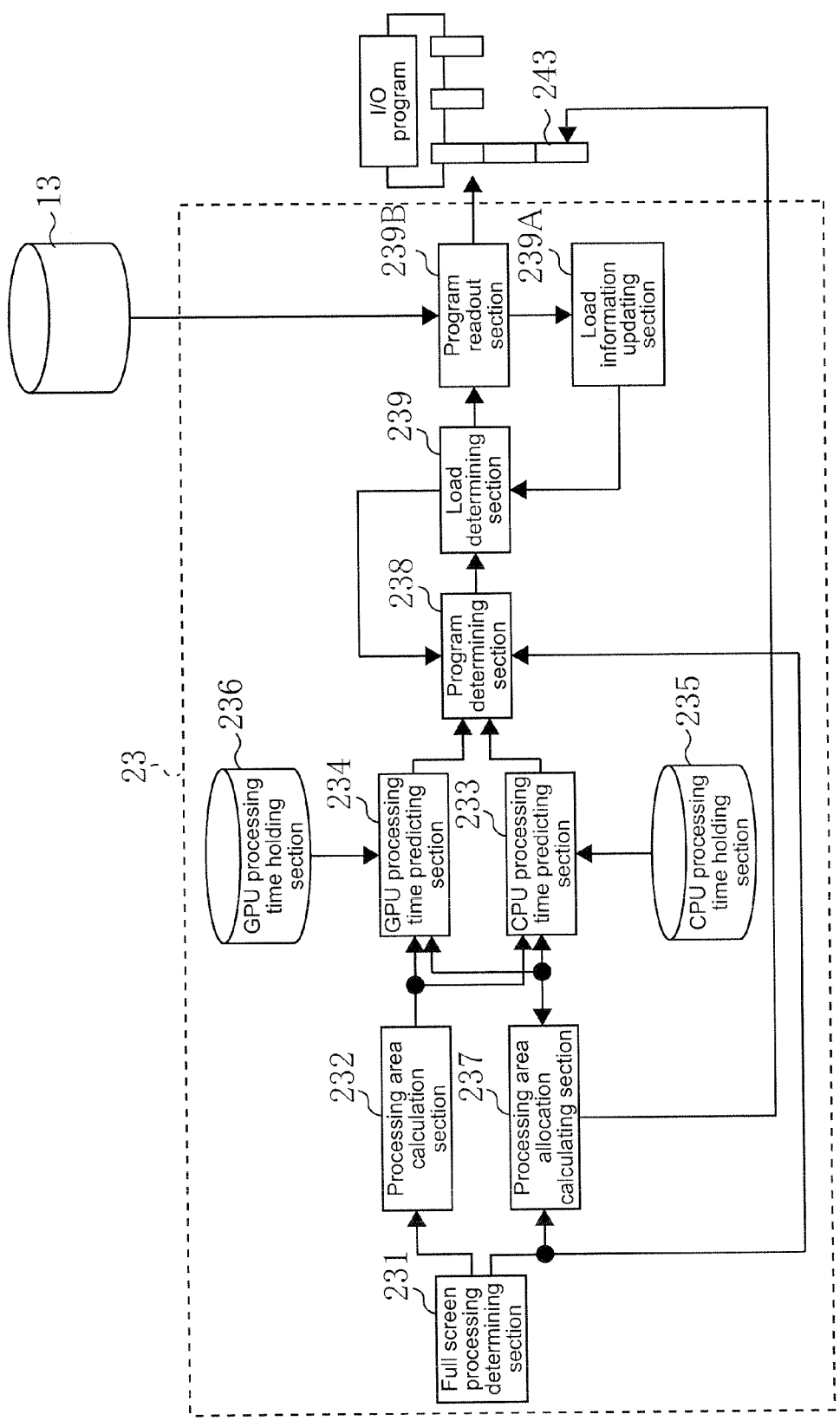
FIG. 7 is a block diagram showing a structure of an effect program selection activating section.

FIG. 7 is a block diagram showing a structure of the effect program selection activating section 23.

As shown in FIG. 7, the effect program selection activating section 23 includes a full screen processing determining section 231, a processing area calculation section 232, a CPU processing time predicting section 233, a GPU processing time predicting section 234, a CPU processing time holding section 235, a GPU processing time holding section 236, a processing area allocation calculating section 237, a program determining section 238, a load determining section 239, a load information updating section 239A, and a program readout section 239B.

The full screen processing determining section 231 determines, based on kinds of effect selected by a user, presence/absence of information designating a processing-target region, and the like, whether the effect processing is processing for all the pixels of image data or processing for part thereof.

The processing area calculation section 232 calculates an area (=processing pixel number) of a processing region to be subjected to an effect.

The CPU processing time holding section 235 holds CPU processing time periods for one pixel for a plurality of kinds of effect, which were experimentally measured previously.

The GPU processing time holding section 236 holds GPU processing time periods for one pixel for a plurality of kinds of effect, which were experimentally measured previously.

The CPU processing time predicting section 233 is used in a case of performing effect processing with respect to part of image data. The CPU processing time predicting section 233 calculates, by using CPU processing time held by the CPU processing time holding section 235, time necessary for the CPU 111 to perform the effect processing as "CPU predicted processing time".

The GPU processing time predicting section 234 is used in a case of performing effect processing with respect part of image data. The GPU processing time predicting section 234 calculates, by using GPU processing time held by the GPU processing time holding section 236, time necessary for the GPU 121 to perform the effect processing as "GPU predicted processing time".

The program determining section 238 determines, based on the CPU predicted processing time calculated by the CPU processing time predicting section 233 and the GPU predicted processing time calculated by the GPU processing time predicting section 234, one of the CPU program 241 and the GPU program 242 in the effect program set 24 as a candidate connected to the I/O program 21. Further, the program determining section 238 determines, in a case where the full screen processing determining section 231 determines effect processing for all the pixels of image data, the respective effect programs in the effect program set 24 as candidates connected to the I/O program 21.

The processing area allocation calculating section 237 is used in a case where the effect program set 24 is determined as a candidate connected to the I/O program 21. The processing area allocation calculating section 237 calculates, in a case where an effect processing with respect to a piece of image data is assigned to the CPU 111 and the GPU 121 by the CPU/GPU control program 243 in the effect program set 24 to be performed, an optimum ratio of the respective processing areas, and notifies the CPU/GPU control program 243 of information thereon.

The load information updating section 239A manages utilization rate of the CPU 111 and the GPU 121 and usage of the GPU memory 122 as load information based on a connection status of an effect program to the I/O program 21.

The load determining section 239 predicts, by using the load information managed by the load information updating section 239A, load information on each of the CPU unit 11 and the GPU unit 12 assuming a case where an effect program is connected. Further, the load determining section 239 requests the program determining section 238 to re-examine the selection result of the connecting candidate or notifies the program readout section 239B of the selection result of the connecting candidate as it is based on the predicting result.

The program readout section 239B reads out at least part of programs of the effect program set 24 corresponding to effects of kinds selected by a user from the storage device 13 based on the information on the connecting candidate supplied from the load determining section 239, and connects the programs to the I/O program 21 as the effect plug-in programs 22.

(Behaviors of Effect Program Selection Activating Section 23)

Next, behaviors of the effect program selection activating section 23 will be described.

Figure 8:
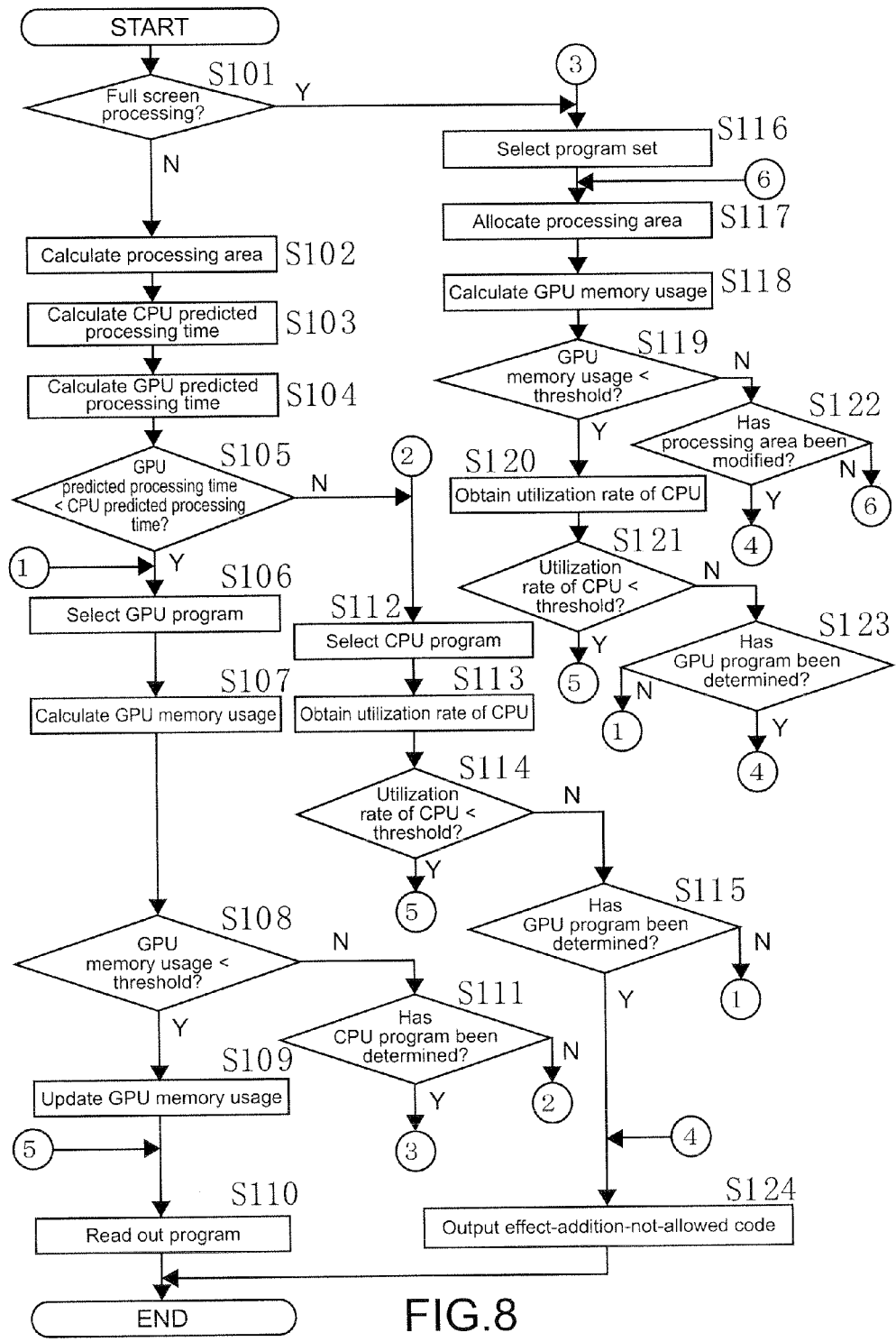
FIG. 8 is a flowchart showing a procedure of behaviors of the effect program selection activating section.

FIG. 8 is a flowchart showing a procedure of behaviors of the effect program selection activating section 23.

Note that the behaviors will be described in the following order.

1. Behavior in determining an effect program as a connecting candidate.
2. Behavior in a case where the GPU program 242 is selected as a connecting candidate.
3. Behavior after the CPU program 241 is determined as a connecting candidate.
4. Behavior in a case where the effect program set 24 is determined as a connecting candidate.

(1. Behavior in Determining an Effect Program as a Connecting Candidate)

First, a behavior in determining an effect program as a candidate connected to the I/O program 21 will be described.

The full screen processing determining section 231 determines whether an effect selected by a user is processing for all the pixels of an image or processing for part of the image (Step S101).

Here, a behavior subsequent to a case where the effect is applied on part of the image will be described (Step S101, N). In this case, the processing time of each of the CPU 111 and the GPU 121 is predicted as follows. First, the processing area calculation section 232 calculates a processing area (=processing pixel number) (Step S102).

Next, the CPU processing time predicting section 233 calculates, based on the CPU processing time held by the CPU processing time holding section 235 and the processing pixel number calculated in Step S102 and by using the following expression (1), time necessary for the CPU 111 to perform the effect processing as "CPU predicted processing time" (Step S103).

$$\text{CPU predicted processing time} = (\text{CPU processing time for one pixel}) \times (\text{processing pixel number}) \quad (1)$$

Next, the GPU processing time predicting section 234 calculates, based on the GPU processing time held by the GPU processing time holding section 236 and the processing pixel number calculated in Step S102 and by using the following expression (2), time necessary for the GPU 121 to perform the effect processing as "GPU predicted processing time" (Step S104).

$$\text{GPU predicted processing time} = (\text{transferring time between CPU and GPU}) + (\text{GPU processing time for one pixel} \times \text{processing pixel number}) \quad (2)$$

The processing time for one pixel held by each of the CPU processing time holding section 235 and the GPU processing time holding section 236 is information experimentally measured previously with respect to the all kinds of effects and stored. Further, processing time for one pixel may be obtained by dividing processing for one pixel into arithmetic instructions (four arithmetic operations including addition, subtraction, multiplication, and division, load/store, conditional branch instruction, shift operation, and logical operation), and approximately calculating based on the number of the instructions and the number of operating frequency of the CPU 111 and the GPU 121. Further, with regard to the "transferring time between CPU and GPU" in the expression (2), "transferring time between CPU and GPU" for size and format of all the images to be treated may be previously measured and stored, and the results may be used to calculate the GPU predicted processing time. Further, the "transferring time between CPU and GPU" may also be calculated based on a bandwidth of the bus 17 between the CPU and the GPU and a data amount of an image.

Note that, in an actual image processing calculation, in a precise sense, in addition to the "arithmetic time for one pixel×processing pixel number", "arithmetic time for incrementing a pixel", "arithmetic time for conditional branch determining a pixel to be processed and a pixel not to be processed", and the like exist. However, since the CPU predicted processing time and the GPU predicted processing time calculated as described above are dominant as a ratio engaging arithmetic time, the CPU predicted processing time and the GPU predicted processing time may be approximate values.

Next, the program determining section 238 determines, based on the CPU predicted processing time and the GPU predicted processing time, the CPU program 241 or the GPU program 242 as a connecting candidate. Specifically, the program determining section 238 determines an effect program whose predicted processing time is smaller as a connecting candidate. For example, in a case where the GPU predicted processing time is smaller than the CPU predicted processing time (Step S105, Y), the program determining section 238 determines the GPU program 242 as a connecting candidate (Step S106). To the contrary, in a case where the GPU predicted processing time is equal to or larger than the CPU predicted processing time (Step S105, N), the program determining section 238 determines the CPU program 241 as a connecting candidate (Step S112).

Meanwhile, examples of the case where the GPU predicted processing time is smaller than the CPU predicted processing time include effect processing uniformly applying productsum operations of hundreds of taps, for example, on a region occupying most of an image. This is because the GPU 121 is capable of setting a thread for each pixel and performing processing in parallel. To the contrary, in a case of applying an effect to a region which is small part of an image, the GPU 121 may not exercise its characteristics enough. Further, actually, the processing time by the GPU 121 includes not only the arithmetic time but also transferring time of image data between the CPU and the GPU. Therefore, for example, in a case where the GPU 121 performs processing whose arithmetic amount is small such as, for example, color conversion to small part of an image having a relatively large size such as 4096×2160 (pixels), a rate occupying the entire processing time by the transferring time of image data increases, whereby the processing may consume time larger than a case where the CPU 111 performs the effect processing.

Returning to the description of the behavior, the description has been made until the behavior of determining an effect program as a connecting candidate from the CPU program 241 and the GPU program 242. However, at this point, the effect program is not yet connected to the I/O program 21 as the effect plug-in program 22 actually. After that, based on the states of loads on the CPU unit 11 and the GPU unit 12 assuming a case where the effect program determined as a connecting candidate is connected to the I/O program 21, the load determining section 239 determines whether connection of the effect program is allowed or not. Next, this behavior will be described.

(2. Behavior in a Case where the GPU Program 242 is Selected as a Connecting Candidate)

First, a case where the GPU program 242 is selected as a connecting candidate in Step S106 will be described.

The load determining section 239 calculates predicted usage of the GPU memory 122 assuming a case where the GPU program 242 is connected to the I/O program 21 (hereinafter, referred to as "GPU memory predicted usage"). The GPU memory predicted usage is calculated by using, for example, the following expression (3) (Step S107).

$$\text{GPU memory predicted usage} = \text{(total amount of memory used for effects already connected)} + \text{(number of image memories used for additional effect)} \times \text{(image memory size)} \quad (3)$$

The load determining section 239 determines whether the obtained GPU memory predicted usage reaches a predetermined threshold (Step S108). Here, the threshold of the GPU memory predicted usage is a predetermined value to determine a depletion state of the GPU memory 122.

In a case where the GPU memory predicted usage does not reach the predetermined threshold (Step S108, Y), the load determining section 239 requests the program readout section 239B to read out the GPU program 242 determined as a connecting candidate by the program determining section 238. Receiving the request, the program readout section 239B requests the load information updating section 239A to update load information due to addition of the GPU program 242. In response to the request, the load information updating section 239A updates the load information (usage) on the GPU memory 122 (Step S109). After that, the program readout section 239B reads out the GPU program 242 determined as a connecting candidate by the program determining section 238 from the storage device 13, and connects the GPU program 242 to the I/O program 21 as the effect plug-in program 22 (Step S110).

Further, in a case where the GPU memory predicted usage reaches the predetermined threshold in the determination in Step S108 (Step S108, N), the load determining section 239 changes an effect program as a connecting candidate from the GPU program 242 to the CPU program 241 (in the case of N in Step S111). As a subsequent behavior, the load determining section 239 determines whether connection of the CPU program 241 is allowed or not considering utilization rate of the CPU 111 assuming a case where the connecting candidate is changed to the CPU program 241. Note that, because the details of this behavior is similar to the behavior subsequent to a case where the CPU program 241 is selected as a connecting candidate in Step S112, the description will be made later. Further, in a case where the GPU memory predicted usage is equal to or larger than the predetermined threshold (Step S108, N) and where it has been determined that connection of the CPU program 241 is not allowed (Step S111, Y), the load determining section 239 changes an effect program as a connecting candidate from the GPU program 242 to the effect program set 24. Because the subsequent behavior is similar to a behavior subsequent to a case where the effect program set 24 is selected as a connecting candidate in Step S116 (described later), the description will be made later.

(3. Behavior after the CPU Program 241 is Determined as a Connecting Candidate)

Next, a case where the CPU program 241 is determined as a connecting candidate in Step S112 will be described.

The load determining section 239 obtains the present utilization rate of the CPU 111 (Step S113). The utilization rate of the CPU 111 may be obtained by using, for example, a CPU utilization rate monitoring function or the like of an OS (Operating System) implemented in the information processing apparatus.

The load determining section 239 determines whether the utilization rate of the CPU 111 reaches a predetermined threshold (Step S114). The threshold of the CPU utilization rate is a design-based predetermined value considering efficiency, stability, and the like of the overall behavior of the information processing apparatus. In a case where the utilization rate of the CPU 111 does not reach the predetermined threshold (Step S114, Y), the load determining section 239 requests the program readout section 239B to read out the CPU program 241 determined as a connecting candidate by the program determining section 238. Receiving the request, the program readout section 239B reads out the CPU program 241 determined as a connecting candidate by the program determining section 238 from the storage device 13, and connects the CPU program 241 to the I/O program 21 as the effect plug-in program 22 (Step S110).

In a case where the utilization rate of the CPU 111 reaches the predetermined threshold (Step S114, N) and where it has been determined that connection of the GPU program 242 is not allowed (Step S115, Y), the load determining section 239 notifies a graphical user interface section (not shown) of an effect-addition-not-allowed code informing that addition of an effect program is not allowed (Step S124). The graphical user interface section is a program accepting selection of an image data as a processing target, selection of effects applied on the image data, input of various parameters, and the like by a user through a display of the display device 19 (FIG. 1), returning replies to them to a user, and the like. Receiving the effect-addition-not-allowed code from the load determining section 239, the graphical user interface section notifies a user that addition of the effect selected by the user is not allowed through the screen of the display device 19 (FIG. 1). Further, in this case, the load determining section 239 asks the program readout section 239B not to issue a request to read out an effect program, whereby an effect program is not newly connected to the I/O program 21, and the processing is completed.

Further, in a case where the utilization rate of the CPU 111 reaches the predetermined threshold in the determination in Step S114 (Step S114, N), and where it has not been determined that connection of the GPU program 242 is not allowed (Step S115, N), the procedure proceeds to Step S106, and the connecting candidate is changed from the CPU program 241 to the GPU program 242. The subsequent behavior is as described above.

(4. Behavior in a Case where the Effect Program Set 24 is Determined as a Connecting Candidate)

Next, a case where the full screen processing determining section 231 determines in Step S101 that effect processing is applied on all the pixels of an image will be described (Step S101, Y). In this case, the full screen processing determining section 231 instructs the program determining section 238 to determine the effect program set 24 (CPU program 241, GPU program 242, and CPU/GPU control program 243) corresponding to the effect selected by a user as a connecting candidate (Step S116).

Next, the full screen processing determining section 231 activates the processing area allocation calculating section 237. The processing area allocation calculating section 237 allocates processing areas to the CPU 111 and the GPU 121, respectively, such that the CPU 111 and the GPU 121 share the effect processing to perform (Step S117). Specifically, the processing areas are allocated as follows. In the following description, a processing area allocated to the CPU 111 is referred to as "CPU processing area", and a processing area allocated to the GPU 121 is referred to as "GPU processing area".

The processing area allocation calculating section 237 requests the CPU processing time predicting section 233 and the GPU processing time predicting section 234 to calculate the CPU predicted processing time and the GPU predicted processing time, respectively. In accordance with the request, the CPU processing time predicting section 233 calculates the CPU predicted processing time based on the CPU processing time held by the CPU processing time holding section 235 and the total number of pixels of an image by using the expression (1). Similarly, the CPU processing time predicting section 233 calculates the GPU predicted processing time based on the GPU processing time held by the GPU processing time holding section 236 and the total number of pixels of the image by using the expression (2).

The processing area allocation calculating section 237 obtains a ratio that the CPU predicted processing time and the GPU predicted processing time calculated by the CPU processing time predicting section 233 and the GPU processing time predicting section 234, respectively, are approximately equal to each other. The processing area allocation calculating section 237 assigns the entire processing area (total number of pixels) to the CPU processing area and the GPU processing area at the obtained ratio, and holds information on the respective processing areas as processing area allocation information (Step S117). The processing area allocation information held by the processing area allocation calculating section 237 will be read out from the storage device 13 by the program readout section 239B later, and notified the CPU/GPU control program 243 connected to the I/O program 21 of.

After the processing area allocation calculating section 237 holds allocation information on the CPU processing area and the GPU processing area, based on the utilization rate of the CPU 111 assuming a case where the effect program set 24 determined as a connecting candidate is connected, the load determining section 239 determines whether connection of the effect program set 24 is allowed or not. Next, this behavior will be described.

The load determining section 239 calculates GPU memory predicted usage assuming a case where the GPU program 242 in the effect program set 24 is connected to the I/O program 21. The GPU memory predicted usage is calculated by the following expression (4) (Step S118).

GPU memory predicted usage=(total amount of memory used for effects already connected)+ (number of image memories used for additional effect)×(image memory size)×(GPU processing area)/(full screen area)  (4)

Next, the load determining section 239 determines whether the calculated GPU memory predicted usage reaches a predetermined threshold (Step S119). In a case where the GPU memory predicted usage does not reach the predetermined threshold (Step S119, Y), the load determining section 239 obtains the utilization rate of the CPU 111 similar to Step S113 (Step S120). Subsequently, the load determining section 239 determines whether the utilization rate of the CPU 111 reaches the predetermined threshold similar to Step S114 (Step S121).

In a case where the utilization rate of the CPU 111 does not reach the predetermined threshold (Step S121, Y), the load determining section 239 determines that connection of the effect program set 24 is allowed, and requests the program readout section 239B to read out the effect program set 24. In accordance with the request, the program readout section 239B reads out the effect program set 24 from the storage device 13, and connects the effect program set 24 to the I/O program 21 as the effect plug-in program 22 (Step S110). After that, the CPU/GPU control program 243 connected to the I/O program 21 is notified of the allocation information held by the processing area allocation calculating section 237. Therefore, an environment in which the CPU 111 and the GPU 121 share to perform the effect processing selected by a user is structured.

Next, a case where the GPU memory predicted usage reaches the predetermined threshold in Step S119 will be described (Step S119, N). In this case, returning to Step S117, the processing area allocation calculating section 237 modifies allocation of the CPU processing area and the GPU processing area (Step S117). The allocation is modified as follows.

First, the processing area allocation calculating section 237 calculates a modified value of the GPU processing area by using the following expression (5).

Modified value of GPU processing area=((total amount of memory that GPU is allowed to use)−(total amount of memory used for effects already connected))/(memory usage for one pixel)  (5)

Further, the processing area allocation calculating section 237 subtracts the modified value of the GPU processing area from the full screen area to thereby obtain the result as a modified value of the CPU processing area.

After that, the load determining section 239 calculates GPU memory predicted usage assuming a case where the GPU program 242 in the effect program set 24 is connected to the I/O program 21 by using the modified value of the GPU processing area and the above-mentioned expression (4) (Step S118). The load determining section 239 determines whether the GPU memory predicted usage obtained as the result reaches the predetermined threshold (Step S119). In a case where the GPU memory predicted usage reaches the threshold (Step S119, N) and where allocation of the CPU processing area and the GPU processing area has been modified (Step S122, Y), the load determining section 239 notifies the graphical user interface section (not shown) of the effect-addition-not-allowed code informing that connection of the effect program is not allowed (Step S124). The subsequent behavior is similar to the above.

As described above, according to this embodiment, in a case where an effect is applied on all the pixels of an image, that is, effect processing of the largest load is performed, the effect program set 24 including the CPU program 241, the GPU program 242, and the CPU/GPU control program 243 is connected to the I/O program 21. As a result, the CPU 111 and the GPU 121 share to perform effect processing with respect to the entire image. Therefore, the speed of effect processing with respect to all the pixels of an image may be improved.

Further, according to this embodiment, in a case where an effect is applied on a region which is part of an image, the program determining section 238 selects an effect program whose predicted processing time is smaller as a connecting candidate from the CPU program 241 and the GPU program 242, whereby the effect processing may be performed faster.

Further, according to this embodiment, in a case where the GPU program 242 is selected as a connecting candidate, the load determining section 239 calculates GPU memory predicted usage assuming a case where the GPU program 242 is connected, and determines whether it reaches a predetermined threshold. In a case where it does not reach the threshold, the GPU program 242 is connected as it is to the I/O program 21 as the effect plug-in program 22. Further, in a case where it reaches the threshold, the connecting candidate is changed to the CPU program 241. Further, the load determining section 239 determines whether a CPU utilization rate reaches a predetermined threshold, and connects, in a case where it does not reach the threshold, the CPU program 241 to the I/O program 21 as the effect plug-in program 22. As a result of the above, in a state of depletion of the GPU memory, execution of effect processing may be secured in a high rate.

Further, according to this embodiment, in a case where the CPU program 241 is determined as a connecting candidate, the load determining section 239 calculates the CPU utilization rate assuming a case where the CPU program 241 is connected, and determines whether it reaches a predetermined threshold. In a case where it does not reach the threshold, the CPU program 241 is connected as it is to the I/O program 21 as the effect plug-in program 22. Further, in a case where it reaches the threshold, the connecting candidate is changed to the GPU program 242. Further, the load determining section 239 determines whether the GPU memory predicted usage reaches a predetermined threshold, and connects, in a case where it does not reach the threshold, the GPU program 242 to the I/O program 21 as the effect plug-in program 22. As a result of the above, even in a state where the CPU utilization rate is too high to perform effect processing, execution of effect processing may be secured in a high rate.

Further, according to this embodiment, in a case where the effect program set 24 is determined as a connecting candidate, an entire processing area (total number of pixels) is assigned to the CPU processing area and the GPU processing area at a ratio that the CPU predicted processing time and the GPU predicted processing time are approximately equal to each other. Therefore, the CPU 111 and the GPU 121 may perform effect processing approximately at the highest speed within their capacities.

Further, according to this embodiment, in a case where the GPU memory predicted usage assuming a case where the effect program set 24 determined as a connecting candidate is connected reaches a threshold, the processing area allocation calculating section 237 modifies allocation of the CPU processing area and the GPU processing area to a value considering an amount of space of the GPU memory. Therefore, in a state where an amount of space of the GPU memory 122 is too small to perform effect processing, the CPU 111 and the GPU 121 may share the effect processing to perform the effect processing at a high speed.

Second Embodiment

In the above-mentioned first embodiment, the CPU predicted processing time is obtained based on the CPU processing time held by the CPU processing time holding section 235 and the processing pixel number, the GPU predicted processing time is obtained based on the GPU processing time held by the GPU processing time holding section 236 and the processing pixel number, and an effect program whose predicted processing time is smaller is determined as a connecting candidate.

In a second embodiment, based on measuring results of effect processing times by the CPU program 241 and the GPU program 242, an effect program enabling a higher speed is determined as a connecting candidate.

Figure 9:
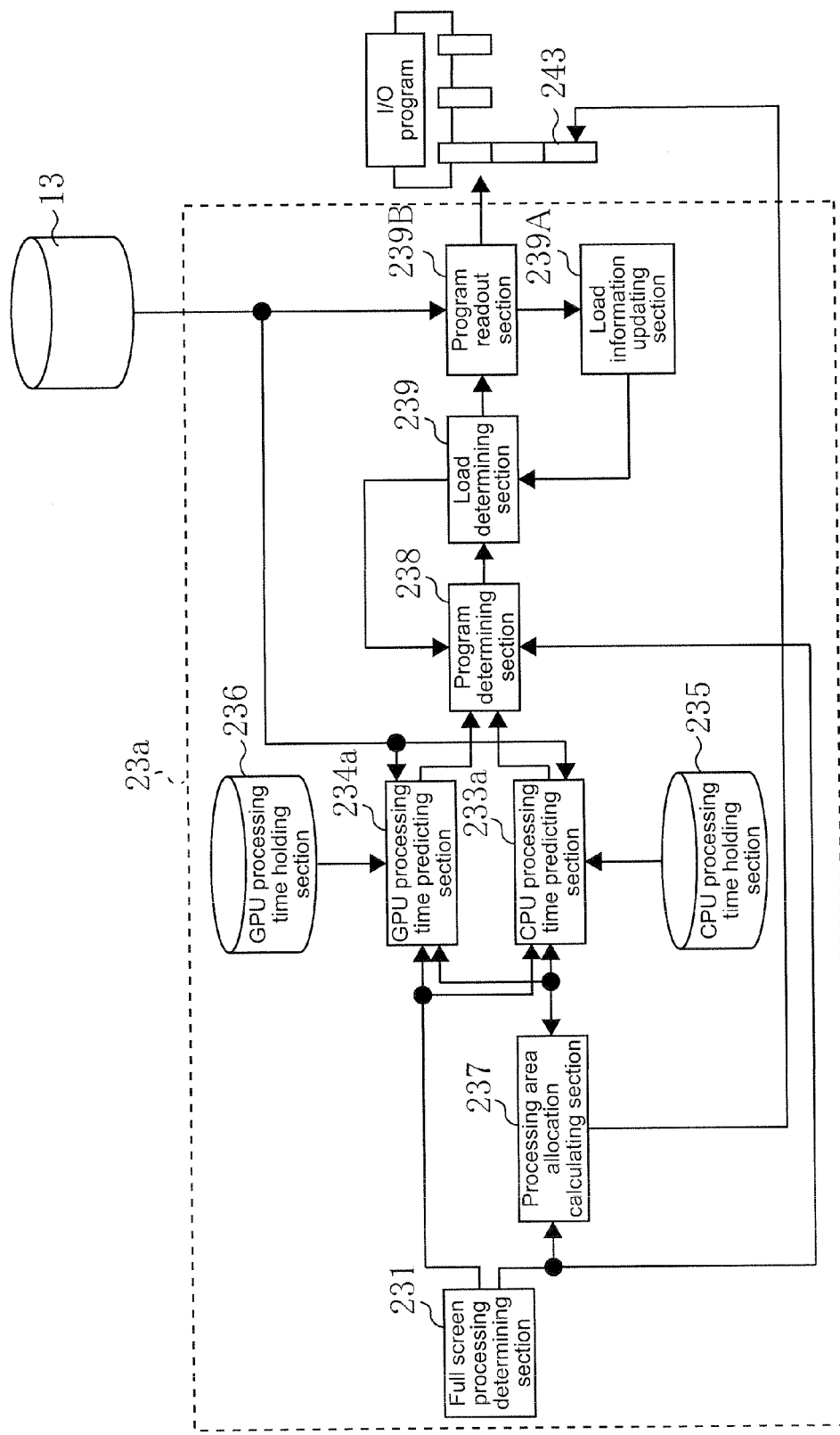
FIG. 9 is a block diagram showing a structure of an effect program selection activating section according to a second embodiment of the present disclosure.
Figure 10:
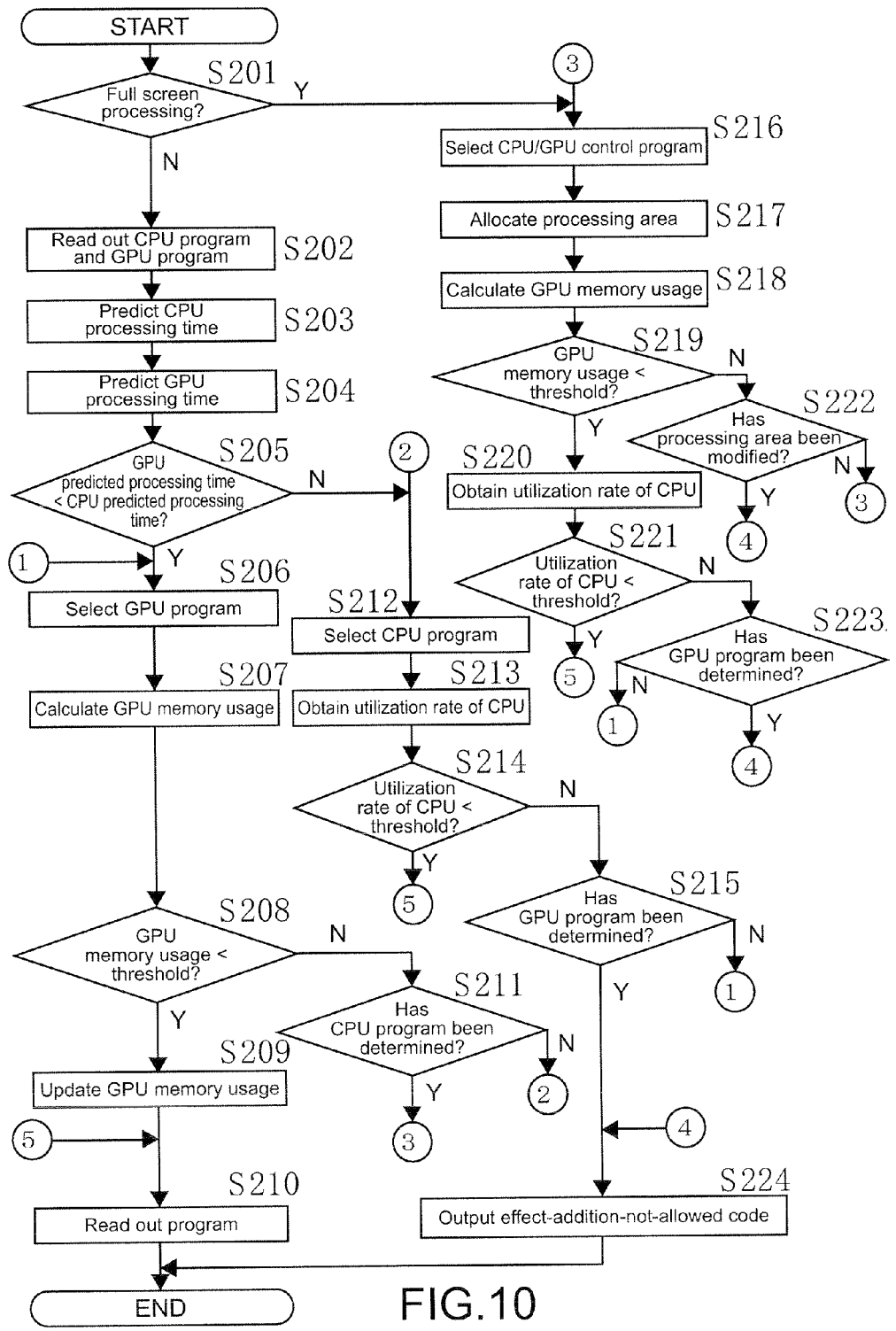
FIG. 10 is a flowchart showing a procedure of behaviors of the effect program selection activating section of FIG. 9.

FIG. 9 is a block diagram showing a structure of an effect program selection activating section 23a according to the second embodiment. FIG. 10 is a flowchart showing a procedure of behaviors of the effect program selection activating section 23a.

In the effect program selection activating section 23a, a CPU processing time predicting section 233a reads out, in a case where effect processing is applied on part of image data, the CPU program 241 from the storage device 13, and measures processing time of the CPU program 241 actually. Meanwhile, a GPU processing time predicting section 234a reads out, in a case where effect processing is applied on part of image data, the GPU program 242 from the storage device 13, and measures processing time of the GPU program 242. Here, the CPU processing time predicting section 233a and the GPU processing time predicting section 234a may measure processing time by performing effect processing with respect to actual image data supplied by the I/O program 21, but are not necessary to use actual image data. That is, processing time may be calculated irrespective of data stored in the CPU memory 112 and the GPU memory 122.

The program determining section 238 determines an effect program whose processing time calculated as described above is smaller as a connecting candidate from the CPU program 241 and the GPU program 242. The other structures and behaviors are similar to those of the first embodiment. According to this structure also, effects similar to those of the first embodiment may be obtained.

Note that the present disclosure is not limited to the embodiments as described above, but may be variously modified within the scope of technological thought of the present disclosure.

The present disclosure contains subject matter related to that disclosed in Japanese Priority Patent Application JP 2010-139719 filed in the Japan Patent Office on Jun. 18, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a first processing unit capable of processing an image;
a second processing unit capable of processing the image in parallel for each unit dividing the image;
a first memory used for processing of the image by the first processing unit;
a second memory used for processing of the image by the second processing unit; and
a controller section configured to control
to select one of the first processing unit, the second processing unit, and both of them as a subject or subjects processing the image,
to divide, in a case where both the first processing unit and the second processing unit are selected, the image into a first region and a second region, and
to assign processing of an image of the first region and processing of an image of the second region, which are obtained, by the division, to the first processing unit and the second processing unit, respectively, to cause the first processing unit and the second processing unit to perform the processing,
to determine an area of the first region and an area of the second region such that a first processing time that it takes for the first processing unit to process the first region is equal to or approximately equal to a second processing time that it takes for the second processing unit to process the second region,
to calculate predicted usage of the second memory assuming a case where processing of the image of the first region and processing of the image of the second region are assigned to the first processing unit and the second processing unit, respectively, to cause the first processing unit and the second processing unit to perform the processing, and to modify, in a case where the calculated predicted usage of the second memory reaches a threshold, the determined area of the first region and the determined area of the second region such that the predicted usage falls in a capacity of the second memory that the second processing unit is allowed to use.

2. The information processing apparatus according to claim 1, wherein the controller section is configured to select, in a case of processing the entire image, both the first processing unit and the second processing unit as the subjects processing the image.

3. The information processing apparatus according to claim 1, wherein the controller section is configured to obtain, in a case where the predicted usage of the second memory fails to exceed the capacity of the second memory, utilization rate of the first processing unit, and to assign, in a case where the utilization rate fails to reach a threshold, processing of the image of the first region and processing of the image of the second region to the first processing unit and the second processing unit selected as the subjects, respectively, to cause the first processing unit and the second processing unit to perform the processing.

4. The information processing apparatus according to claim 3, wherein the controller section is configured to calculate, in a case of processing part of the image, a predicted processing time assuming a case where the first processing unit processes the part of the image and a predicted processing time assuming a case where the second processing unit processes the part of the image, and to select a processing unit whose predicted processing time is smaller as a subject processing the part of the image.

5. The information processing apparatus according to claim 4, wherein the controller section is configured to calculate, in a case where the second processing unit is selected as the subject, predicted usage of the second memory assuming a case where the second processing unit processes the part of the image, and to cause, in a ease where the calculated predicted usage of the second memory fails to reach the threshold, the second processing unit to process the part of the image.

6. The information processing apparatus according to claim 5, wherein the controller section is configured to obtain, in a case where the first processing unit is selected as the subject, utilization rate of the first processing unit, and to cause, in a case where the utilization rate fails to reach a threshold, the first processing unit to process the part of the image.

7. The information processing apparatus according to claim 1, wherein the controller section includes the first processing unit, and a program causing the first processing unit to function as the controller section.

8. A method for controlling an information processing apparatus including a first processing unit capable of processing an image, a second processing unit capable of processing the image in parallel for each unit dividing the image, and a memory used for processing of the image by the second processing unit, comprising:

selecting, by a controller section, one of the first processing unit, the second processing unit, and both of them as a subject or subjects processing the image;

dividing, in a case where both the first processing unit and the second processing unit are selected, the image into a first region and a second region;

assigning processing of an image of the first region and processing of an image of the second region, which are obtained by the division, to the first processing unit and the second processing unit, respectively, to cause the first processing unit and the second processing unit to perform the processing;

determining an area of the first region and an area of the second region such that a first processing time that it takes for the first processing unit to process the first region is equal to or approximately equal to a second processing time that it takes for the second processing unit to process the second region;

calculating predicted usage of the memory assuming a case where processing of the image of the first region and processing of the image of the second region are assigned to the first processing unit and the second processing unit, respectively, to cause the first processing unit and the second processing unit to perform the processing; and modifying, in a case where the calculated predicted usage of the memory reaches a threshold, the determined area of the first region and the determined area of the second region such that the predicted usage falls in a capacity of the memory that the second processing unit is allowed to use.

9. A non-transitory computer-readable recording medium for storing a computer program that when executed on a computer including a first processing unit capable of processing an image, a second processing unit capable of processing the image in parallel for each unit dividing the image, and a memory used for processing of the image by the second processing unit, causes the computer to execute a controlling process, the program comprising the steps of:

selecting one of the first processing unit, the second processing unit, and both of them as a subject or subjects processing the image, dividing, in a case where both the first processing unit and the second processing unit are selected, the image into a first region and a second region, assigning processing of an image of the first region and processing of an image of the second region, which are obtained by the division, to the first processing unit and the second processing unit, respectively, to cause the first processing unit and the second processing unit to perform the processing, determining an area of the first region and an area of the second region such that a first processing time that it takes for the first processing unit to process the first region is equal to or approximately equal to a second processing time that it takes for the second processing unit to process the second region, calculating, predicted usage of the memory assuming a case where processing of the image of the first region and processing of the image of the second region are assigned to the first processing unit and the second processing unit, respectively, to cause the first processing unit and the second processing unit to perform the processing, and modifying, in a case where the calculated predicted usage of the memory reaches a threshold, the determined area of the first region and the determined area of the second region such that the predicted usage falls in a capacity of the memory that the second processing unit is allowed to use.

* * * * *

UNITED STATES PATENT AND TRADEMARK OFFICE
CERTIFICATE OF CORRECTION

PATENT NO. : 8,482,571 B2
APPLICATION NO. : 13/157934
DATED : July 9, 2013
INVENTOR(S) : Hisakazu Shiraki It is certified that error appears in the above-identified patent and that said Letters Patent is hereby corrected as shown below:

On the Title page, Item [54] and in the Specification, Column 1, Title should read:

--INFORMATION PROCESSING APPARATUS, METHOD FOR CONTROLLING INFORMATION PROCESSING APPARATUS, AND PROGRAM--.

Signed and Sealed this
Thirteenth Day of August, 2013

Teresa Stanek Rea
*Acting Director of the United States Patent and Trademark Office*